Oct. 16, 1962  E. D. LARSON ETAL  3,058,590
AIR-SWEEP CLASSIFIER
Filed Dec. 19, 1960
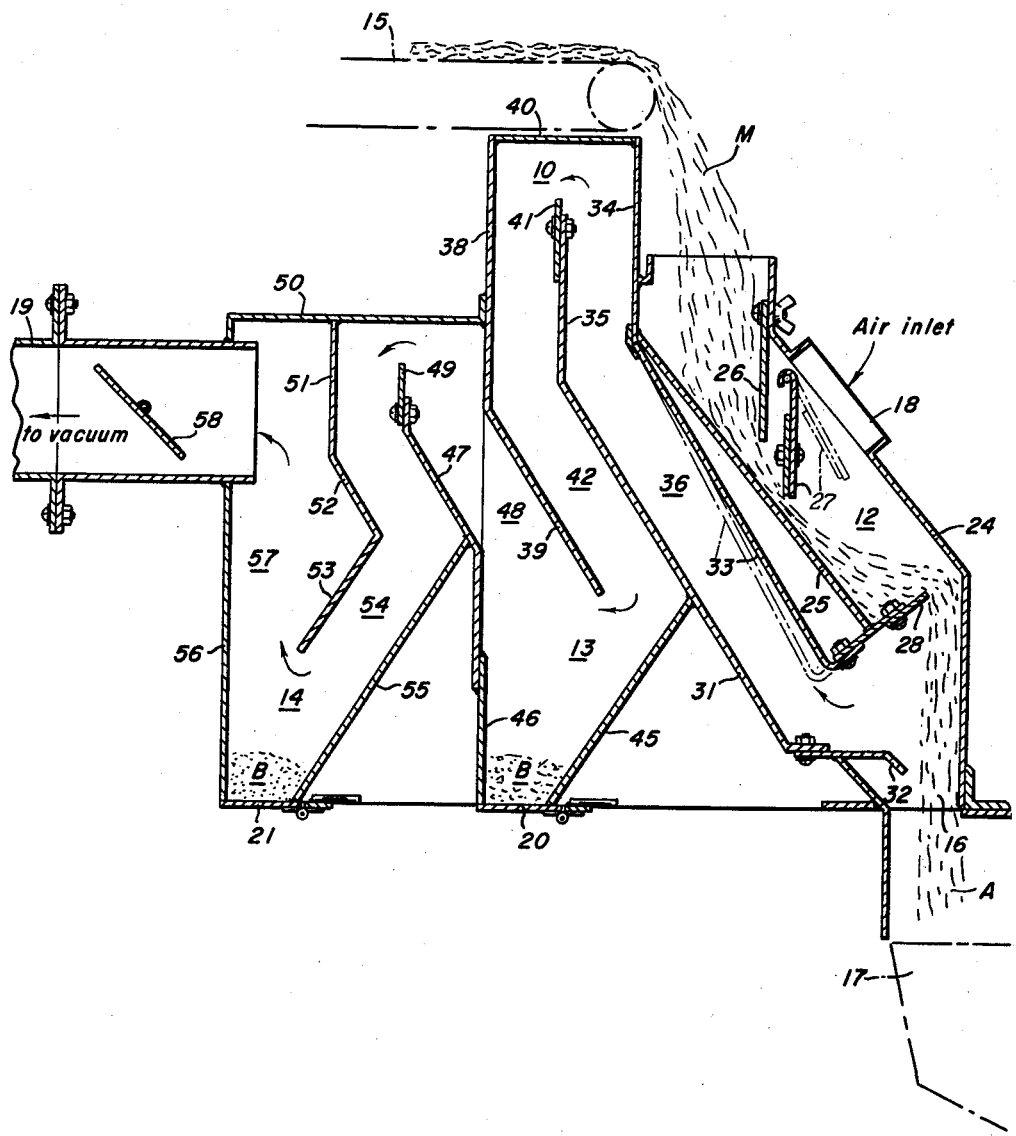
INVENTORS
ERNEST D. LARSON and
GEORGE B. RODEN
By Donald G. Dalton
Attorney

United States Patent Office 3,058,590
Patented Oct. 16, 1962

3,058,590
AIR-SWEEP CLASSIFIER
Ernest D. Larson, Orem, and George B. Roden, Draper, Utah, assignors to United States Steel Corporation, a corporation of New Jersey
Filed Dec. 19, 1960, Ser. No. 76,639
3 Claims. (Cl. 209—137)

This invention relates to an improved classifier for separating particulate material into fractions of different density.

An example of an operation in which we have successfully used our classifier is in separating excess diatomaceous earth from ammonium nitrate prills. Conventionally ammonium nitrate is packaged for sale in the form of small grains, known as "prills," which are coated with diatomaceous earth to prevent them from absorbing moisture and sticking together. Excess diatomaceous earth causes a dust problem as the nitrate in handled before it is packaged, and later undesirably dilutes the nitrate. Nevertheless it is apparent our classifier can be used elsewhere for overcoming analogous problems, and the invention is not limited to use with any specific material.

An object of the invention is to provide an improved classifier of simple construction for reducing air-borne dust accompanying another material to allowable non-toxic limits.

A further object is to provide an improved air-operated classifier which includes means for separating particulate material into different density fractions and means for recovering the respective fractions.

A more specific object is to provide an improved air-operated classifier which separates particulate material into different density fractions in a washer chamber and which recovers the air-borne lighter density fraction in a series of vacuum chambers.

In accomplishing these and other objects of the invention, we have provided improved details of structure, a preferred form of which is shown in the accompanying drawing, in which:

The single FIGURE is a vertical sectional view of our classifier, also illustrating diagrammatically its relation to a feeder and a receiver.

Our classifier includes a pair of opposed side walls 10 and a series of transverse walls and partitions (hereinafter enumerated in more detail) which extend between said side walls and define a washer chamber 12, a first vacuum chamber 13, a second vacuum chamber 14 and passages connecting the chambers. The top of chamber 12 is open, and we feed unclassified particulate material M thereto from a vibrating conveyor 15. For example, this material may be ammonium nitrate prills coated with diatomaceous earth and containing an undesirable excess of the latter. A high density fraction of this material (for example coated prills) discharges through an opening 16 in the bottom of the classifier to a suitable receiver 17, such as a bucket elevator. Chamber 12 has an air inlet 18. A pipe 19 extends from the second vacuum chamber 14 and is connected to a suitable vacuum source, not shown. Thus we draw air successively through chambers 12, 13 and 14. The air picks up a low density fraction of the material (for example excess diatomaceous earth) in chamber 12 and deposits this fraction in chambers 13 and 14, which have hinged spring-held doors 20 and 21 at their lower ends for removing material collected therein. Air which ultimately discharges via pipe 19 is relatively dust-free.

In more detail, washer chamber 12 has downwardly sloping transverse front and back walls 24 and 25 fixed to the side walls 10. A spreader 26 is mounted in the upper portion of chamber 12 for vertical adjustment to regulate the flow of material M through the chamber. A vertical baffle 27 is mounted in chamber 12 for vertical adjustment upwardly about its mounting opposite the air inlet 18 to regulate the air. An adjustable weir 28 is mounted on the back wall 25 of the chamber. All material discharging from the chamber flows over this weir. The majority of the high density particles drop directly from the weir through the opening 16.

An upwardly sloping transverse wall 31 and a narrow bottom wall section 32 are fixed to side walls 10 below and rearwardly of chamber 12. A plate 33 of approximately L-shaped in side elevation is adjustably mounted on the underside of the back wall 25 of chamber 12. Walls 25 and 31 have vertical extensions 34 and 35 at their upper ends. As air flows through the material crossing the weir 28, it picks up most of the free low density particles B along with a few high density particles and sweeps them back under the washer chamber 12 and upwardly through a passage 36 formed between wall 31 and plate 33 and farther up between the vertical extensions 34 and 35. The portion of passage 36 immediately under the entry end of plate 33 forms a venturi throat, the opening of which can be adjusted by changing the position of the plate. As the air and entrained particles flow upwardly through passage 36, high density particles fall out and drop through the opening 16.

A vertical transverse wall 38 and a sloping extension 39 are fixed to side walls 10 rearwardly of walls 35 and 31. A top wall section 40 connects walls 34 and 38. The upper end of wall 35 carries a vertically adjustable baffle 41. From passage 36 air and entrained particles flow over baffle 41 and thence downwardly through a passage 42 formed between walls 35 and 38 and farther down between walls 31 and 39. As air and particles pass baffle 41, their direction of flow changes abruptly, whereupon any remaining high density particles fall back through passage 36. The lower end of passage 42 leads to the first vacuum chamber 13, which has a downwardly sloping front wall 45 and a vertical rear wall 46, both extending transversely between the side walls 10. An upwardly sloping transverse wall 47 is fixed to side walls 10 extending from the upper edge of wall 46. As air leaves the lower end of passage 42, it enters a passage 48 formed between walls 39 and 47. Again its direction of flow changes abruptly, whereupon a portion of the entrained low density particles B fall out and collect in the bottom of chamber 13. The upper end of wall 47 carries a vertically adjustable baffle 49. A top wall section 50 extends rearwardly from wall 38 and overlies baffle 49. As air and particles reach the top of passage 48 and flow over baffle 49, their direction of flow once more changes abruptly, whereupon more low density particles fall back into chamber 13.

A vertical transverse wall 51 extends downwardly from the top wall section 50 and has reversely sloping extensions 52 and 53 at its lower end. From baffle 49 air and entrained particles flow downwardly through a passage 54 formed between walls 51, 52 and 53 on one side and wall 47 on the other side. This passage leads to the second vacuum chamber 14, which has a downwardly sloping front wall 55 and a vertical rear wall 56, both extending transversely between the side walls 10. As air leaves the lower end of passage 54 it enters a passage 57 formed between walls 53 and 56. Again its direction of flow changes abruptly, whereupon still more of the entrained low density particles fall out and collect in the bottom of chamber 14. Pipe 19 is connected into the upper portion of the back wall 56 of chamber 14 and contains an adjustable damper 58 for further regulating the air drawn through the chambers.

We find our classifier can separate particles whose density ratio is as close as 1.5 to 1. In the example of nitrate prills and diatomaceous earth, the density ratio is about 5 to 1; hence the separation is readily effected. In this example we maintain a partial vacuum of only about 3 to 5 inches of water in pipe 19 at the exit side of damper 58. The recovered high density particles are relatively free of low density particles, while most of the latter collect in the two vacuum chambers from which they are readily removed for re-use. Air which ultimately discharges from the classifier has low dust content, well within allowable non-toxic limits.

While we have shown and described only a single embodiment of the invention, it is apparent that modifications may arise. Therefore, we do not wish to be limited to the disclosure set forth but only by the scope of the appended claims.

We claim:

1. A classifier comprising a pair of spaced apart side walls, transverse walls fixed to said side walls and defining therewith a washer chamber, first and second vacuum chambers, upwardly and downwardly extending passages connecting said washer chamber and said first vacuum chamber, and other upwardly and downwardly extending passages connecting said first and second vacuum chambers, walls closing the top and bottom of said vacuum chambers and passages, the transverse walls which define said washer chamber being downwardly inclined away from said vacuum chambers and located adjacent one end of said side walls, said washer chamber having an open top and bottom and an air inlet opening in one of said downwardly inclined walls, a weir supported on the other of said downwardly inclined walls and located within said washer chamber below said opening, means for feeding unclassified particulate material to said washer chamber through the open top thereof and over said weir, and means connected to said second vacuum chamber for applying a partial vacuum to said vacuum chambers, washer chamber and passages and thereby drawing in air through said opening, said weir and opening being positioned to enable air thus drawn in to pass downwardly through particulate material as it crosses the weir and pick up low density particles present in the material while allowing high density particles to discharge through the open bottom of said washer chamber, the walls which separate said passages providing points where the direction of air flow changes abruptly enabling low density particles entrained in the air to fall out and collect in said vacuum chambers.

2. A classifier as defined in claim 1 further comprising an adjustable plate mounted on the underside of the downwardly inclined wall which supports said weir, said plate being spaced from one of the transverse walls which defines the upwardly extending passage between said washer chamber and first vacuum chamber and forming with this wall a venturi throat.

3. A classifier as defined in claim 1 in which said weir is adjustably supported and further comprising adjustable baffles mounted on the transverse walls which separate upwardly and downwardly extending passages.

References Cited in the file of this patent

UNITED STATES PATENTS

| | | |
|---|---|---|
| 520,653 | Mober | May 29, 1894 |
| 1,511,789 | Vilm | Oct. 14, 1924 |
| 2,130,880 | Durning | Sept. 20, 1938 |